United States Patent [19]

Hillis

[11] Patent Number: 4,791,641
[45] Date of Patent: Dec. 13, 1988

[54] PARALLEL PROCESSOR ERROR CHECKING

[75] Inventor: W. Daniel Hillis, Brookline, Mass.

[73] Assignee: Thinking Machines Corporation, Cambridge, Mass.

[21] Appl. No.: 907,671

[22] Filed: Sep. 15, 1986

[51] Int. Cl.[4] .......................................... G06F 11/10
[52] U.S. Cl. .................................................... 371/38
[58] Field of Search ..................... 371/37, 38, 51, 49; 364/200, 900

[56] References Cited

U.S. PATENT DOCUMENTS

| | | | |
|---|---|---|---|
| 3,660,646 | 5/1972 | Milmore | 364/740 |
| 4,215,395 | 7/1980 | Bunyard et al. | 364/101 |
| 4,228,496 | 10/1980 | Katzman et al. | 364/200 |
| 4,240,156 | 12/1980 | Doland | 371/43 |
| 4,295,218 | 10/1981 | Tanner | 371/40 |
| 4,310,879 | 1/1982 | Pandeya | 364/200 |
| 4,314,350 | 2/1982 | Toy | 364/740 |
| 4,414,669 | 11/1983 | Heckelman et al. | 371/49 |
| 4,473,902 | 9/1984 | Chen | 371/37 |
| 4,583,224 | 4/1986 | Ishii et al. | 371/36 |

Primary Examiner—Charles E. Atkinson
Attorney, Agent, or Firm—Weingarten, Schurgin, Gagnebin & Hayes

[57] ABSTRACT

A system for error correction in the reading and writing of data to memory in a multiprocessor environment such as a parallel processor. The data written to and read from memory for each processor is channeled through a single error correcting system which effectively treats the data for plural memories associated with plural processors as a single data word and generates a single error correcting code for that combined data word. By applying a single error correcting methodology to a plurality of memories and associated processors, far greater efficiency is achieved in the parallel processor environment. The read and write operations for the plural memories must be accomplished substantially simultaneously in order that the read and write operations can be treated as acting on a single word and a single error correcting code generated. This ideally suits the system for use in parallel processor environments where the processing function is distributed over a multiplicity of processors and associated memories, acting in parallel.

12 Claims, 2 Drawing Sheets

PARALLEL PROCESSOR ERROR CHECKING

CROSS REFERENCE TO RELATED APPLICATIONS

The following, commonly assigned, related applications are specifically incorporated herein by reference:

Application Ser. No. 499,474, filed May 31, 1983 for Parallel Processor;

Application Ser. No. 499,471, filed May 31, 1983, now U.S. Pat. No. 4,709,327, for Parallel Processor/Memory Circuit;

U.S. Pat. No. 4,598,400, issued July 1, 1986 for Method and Apparatus for Routing Message Packets;

Application Ser. No. 740,943, filed May 31, 1985 for Method and Apparatus for Interconnecting Processors in a Hyperdimensional Array.

FIELD AND BACKGROUND OF THE INVENTION

The present invention relates to method and apparatus for error corrections in the read/write cycles of plural memories in a parallel processor data processing system.

With the increasing size of random access memory utilized in association with a digital processor as part of an overall computation system it has become necessary to provide for the correction of errors occurring in the read/write operations to such large memories. A simple form of error correction involves the use of a parity bit as an auxiliary digital bit in a multibit word which was either a binary one or a zero based upon a function of the bit characteristics of each bit position in a data word. A difference, representing an error, between the digital word as read and the digital word as written into memory, for example, could be detected by the use of the parity bit in the case of a single, or odd number of bit errors in the word by recording the parity bit with the word as written to memory and comparing the retrieved parity bit with a reconstruction of the parity bit from the data word as read. If a difference occurred it was an indication of an error in an odd number of bits. Typically the probabilities of error were sufficiently low that the likelihood was insignificant of an error in all but a single bit. The use of the parity bit could not determine where the error existed but would alert the computer system to the presence of an error and auxiliary corrective steps, such as a second attempt to read data correctly, could be utilized.

More recently, more sophisticated error correcting codes were developed according to one or another algorithms which were a function all bits of each digital word. In writing and reading operations these error correcting codes are recorded in memory at the same address as the data word itself. Error detecting circuitry is operative on the digital word and error correcting code read from memory to not only identify the existence of an error but to spot which bit might be in error and to provide a correction of it. Depending upon the sophistication of the error correcting code, errors in one or more bit positions could be detected. One common methodology utilized with a sixteen bit processor and memory uses a six bit error correcting code generated, as a function of each bit in a data word, by a specific algorithm that was adapted to provide recognition of the most common error types.

Of course, except for complete redundancy, it is impossible to detect all errors that might occur in the read/write cycles of digital memories. It has, however, been found sufficient to utilize less than complete redundancy, such as a six bit correcting code on a sixteen bit data word, to greatly increase the probability of being able to store and retrieve data correctly from a memory despite the existence of a certain, predetermined set of errors to which such memories are typically prone.

With the advent of parallel processing digital computers, of which the above referenced U.S. Patent Applications are representative, the inherent speed limitations of serial processing of data even by extremely large and fast processors and associated memories is avoided by distributing the processing function into a large number of parallel processors and associated memories, each of which may be relatively small compared to the processor and memory sizes of large computers but which, when associated with each other through a heirarchical arrangement of communication networks permits them to effectively process vast amounts of data very rapidly.

The memory size of each memory associated with a single processor in such a parallel processor arrangement may be relatively small, for example on the order of 4K bits. While it is technically feasible to design a memory of that size which, by itself, would exhibit sufficiently low fault or error rates that no error correcting might be required, when considering that tens of thousands of such memories are typically employed in a parallel processor arrangement, the error likelihood increases dramatically as a statistically function of the entire assemblage of memories. As a result, it becomes necessary to apply error corrections to each of the thousands of such memories in a parallel processor arrangement. The cost of adding an error correcting system to each such memory greatly increases the costs of such a parallel processing system.

BRIEF SUMMARY OF THE INVENTION

In accordance with the teaching of the present invention, a systems is disclosed for enhancing the effectiveness and efficiency of error correction in read/write operations of a plurality of memories associated with plural data processors in a parallel processor environment.

According to the present invention, the reading and writing of data between a plurality of memories and associated parallel processor is synchronized and coordinated to form a single data word and a unitary error correction code determined from the single data word. The single data word comprises a collection of data words to be written or read from plural memories. The error correcting code developed taking the plural data words as unitary word greatly enhances the efficiency and effectiveness of error correction in the multiprocessor environment. The unitary error correcting code applicable to the single data word incorporating plural data words being read from and written to the plural memories can be a single parity bit or a more complex set of bits developed from one of several error correction algorithms designed to correct for error in one or more bit locations in the single, combination data word.

In one embodiment of the invention, plural memories are typically coordinated by parallel processors of a computational facility in which the computational power is distributed into the plurality of parallel, and simultaneous acting, small processors. The memory, read/write data flow from or governed by a set of several of such processors is combined to form a single, simultaneously applied, data word which is stored in the plural associated memories along with an error correcting code developed by a unitary error correcting code generator forming the code as a function of the combined words from the plural processors. The memory to which the combined word and associated error correcting code is applied may be plural separate memories, or segmented portions of a single hardware memory. Data read from such memory or memories is then processed by a unitary error detection and correction scheme to return a corrected combined data word which is then separated for application to or utilization by corresponding ones of the set of plural processors.

DESCRIPTION OF THE DRAWING

These and other features of the present invention are more fully set forth below in the exemplary detailed description and accompanying drawing of which.

DETAILED DESCRIPTION

The present invention contemplates an enhancement in error correction capability in read/write functions associated with plural memories and corresponding processors, typically involved in a multiprocessor or parallel processor environment.

Figure 1:
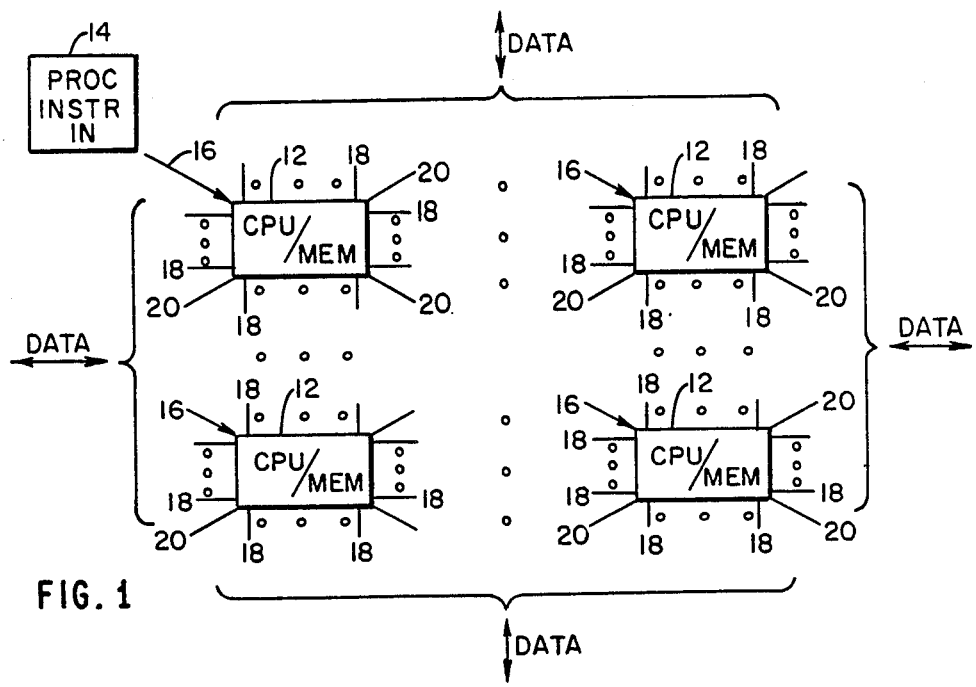
FIG. 1 is a generalized block diagram of a parallel processor environment.

With reference to FIG. 1 there is shown a block diagram representing the environment of a parallel processor system, and in particular such systems as are found in the above referenced incorporated applications. In particular, such a parallel processor environment will have a plurality of modules 12 representing small parallel acting processors and associated memories. Such processors will typically be operated under the control of an external processor 14 through control lines 16, as is more fully described in the above referenced applications. In addition, data flow between the processor and memory modules 12 within the parallel processor environment over data lines 18 is typically governed by a communication scheme whereby a set, N, of processor memory modules 12 may be in direct communication with each other whereas communication between other modules 12 would require data exchange through one or more other processors. Additional control lines 20 are utilized to facilitate the flow of data and control signals throughout the multiprocessor environment as is more fully described in the above identified applications.

Figure 2:
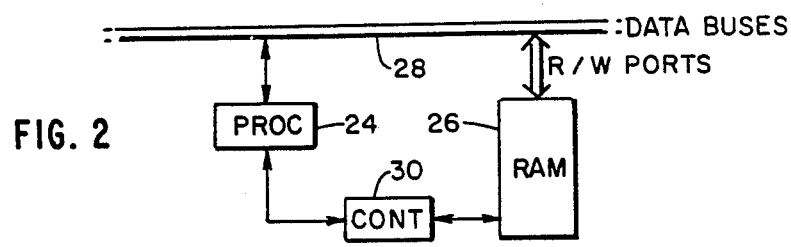
FIG. 2 is a generalized block diagram of data flow and control between a processor and associated random access memory.

Within each processor memory modular 12, as is more completely illustrated in FIG. 2, there exits an identifiable processor 24 and associated random access memory or memory 26. Data communication may be directly between processor and memory or over a data bus 28 under the governance of a control interface 30 which determines read/write functions of data to the memory 26 in association with the processor 24. FIG. 2 illustrates a generalized relationship between processor and memory, neglecting input/output functions.

Figure 3:
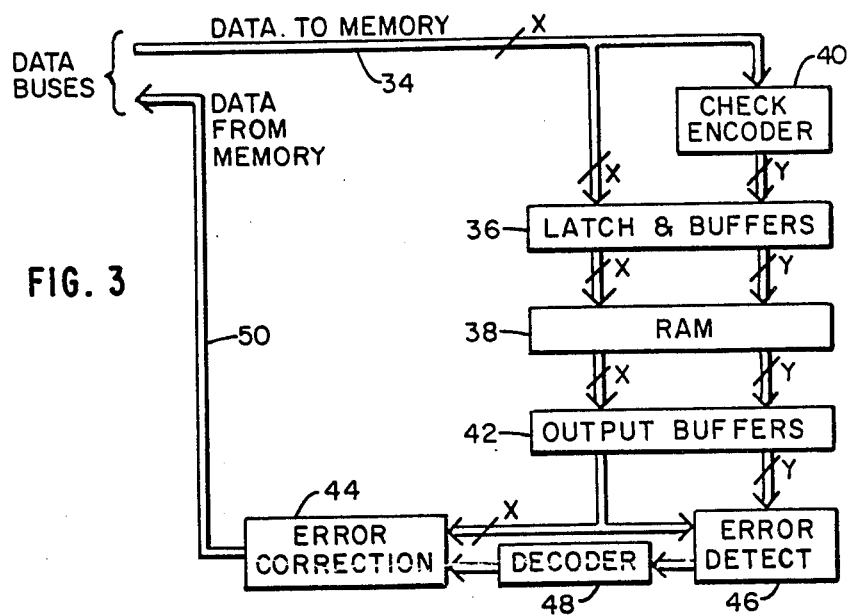
FIG. 3 is a block diagram illustrating at typical error correcting scheme for reading and writing data to and from memory.

While the memory 26 may appear to the outside world and indeed to the processor 24 and control elements 30 as a simple physical memory to which data is written and read, present day demand for reliability, in combination with high memory volume, has required the use of an error correcting scheme in the read/write function. A generalized representation of such a scheme is illustrated in FIG. 3. The error correcting scheme corrects for the chance error that would cause a data word read from memory to differ in one or more bit positions from the data word recorded in memory. According to the methodology of FIG. 3, data being applied to memory over a data bus 34, typically having a bit size, X, which in many cases is sixteen bits, is applied through latch or buffer circuitry 36 to the actual storage hardware of a random access memory 38. Each data word on the bus 34 is also applied to an encoder circuit 40 which generates, according to a predetermined methodology, an error correcting code or data word having, typically, a shorter number of bits, Y, which is also applied through the interfacing circuits 36 to the memory 38 for storage along with the data word on the bus 34 at the same address. In the typical case of a sixteen bit data word on the bus 34, the size of the error correcting code from the encoder 40 is typically six bits in length according to well known error correcting methodology. The encoder 40 generates a code word which is a function of the specific bit states of the data word on the bus 34 and is statistically based to permit discovery and pinpointing of the most likely errors to occur in data read from the memory 38. If complete redundancy were required, the error correcting code would be a duplicate of the originally recorded word. For a minimal indication of error, the error correcting code would be a simple parity bit. In between there occurs a range of possibilities. The statistical likelihood of error and its type determines the most advantageous and economical manner of generating a correcting code by the encoder 40. The object is to minimize the amount of additional circuitry and size of the error correcting code and memory space which must be allocated to it while at the same time providing a necessary level of reliability for accurate data writing and reading.

In reading from the memory 38, the data from the bus 38 along with the error correcting code are applied through output buffers 42 respectively to an error correction circuit 44 and an error detecting circuit 46. The error detector 46 determines by reading the error correcting code in association with the readout data whether or not an error has occurred. If an error has occurred, a decoder circuit 48 can determine, if that error is in one of the expected class of errors, where the error has occurred and instructs the error correction circuitry 44 to correct the readout data so that the data applied from the correction circuit 44 on an output bus 50 is an exact reproduction of the original word on the bus 34 applied to that memory address in the memory 38. Should the error in the output word not be of an expected category, for example, an error in more than one bit positions of the original data word, it may be impossible to restore or correct the read data and additional detection circuitry is sometimes utilized to identify this condition and signal, via interrupts or other control paths, an error condition in memory utilization.

Since the correction of memory read/write errors utilizing error correction technologies is essentially a statistically based process utilizing probability and experienced based determinations of likely failure modes, its complexity is a function of not so much the likelihood that an error will occur, but the likely manner in which that error may appear. The hardware and the time required for its operation cycle must nevertheless be provided for regardless of how low the probability of its being required. As a result its required utilization is very infrequent. Nevertheless the hardware and duplication entailed must be provided in order to insure the requisite level of memory reliability.

In the enviroment of multiple processors, in which the memory processor relationship of FIG. 2 is duplicated a great many times, typically tens of thousands of times, the additional system complexity required by utilization of an error correcting system in association with each memory becomes a substantial economic and processing speed burden. Even though the likelihood of an error in a small memory may be very small, when multiplied across the many memories required the probability reaches a level which necessitates the use of error correction. And since it cannot be adequately predicted which memory may cause an error it is then required that error correction be applied to each small memory.

In accordance with the teaching of present invention, far more efficient use of error correction in a multiprocessor multimemory environment is made by associating together the data flow between plural processors and plural memories and utilizing on that data a unitary error correction scheme. Because, in the parallel processor environment, the flow of data between processors and their memories in a set of processors is typically synchronized for simultaneous read/write cycles, the use of a unitary error correcting system for such a set of plural processors becomes feasible. Because the chance for any error in a read/write operation with memory is still substantially small, it is possible to employ a unitary error correcting code generated for a combined data word, incorporating all the data in and out of the plurality memories associated with the plural processors, with less than complete redundancy of components used for more localized error correcting. This greatly enhances the operational efficiency and minimizes hardware costs in a parallel processor environment.

Figure 4:
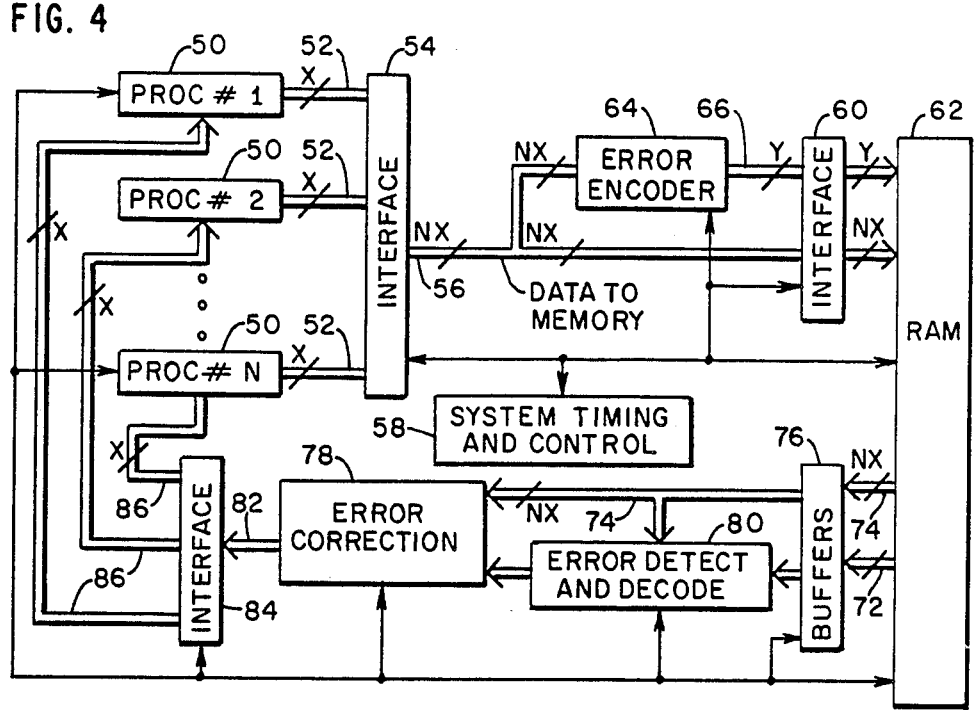
FIG. 4 is a block diagram of the use of a unitary error correction methodology with plural processors and associated memory.
Figure 5:
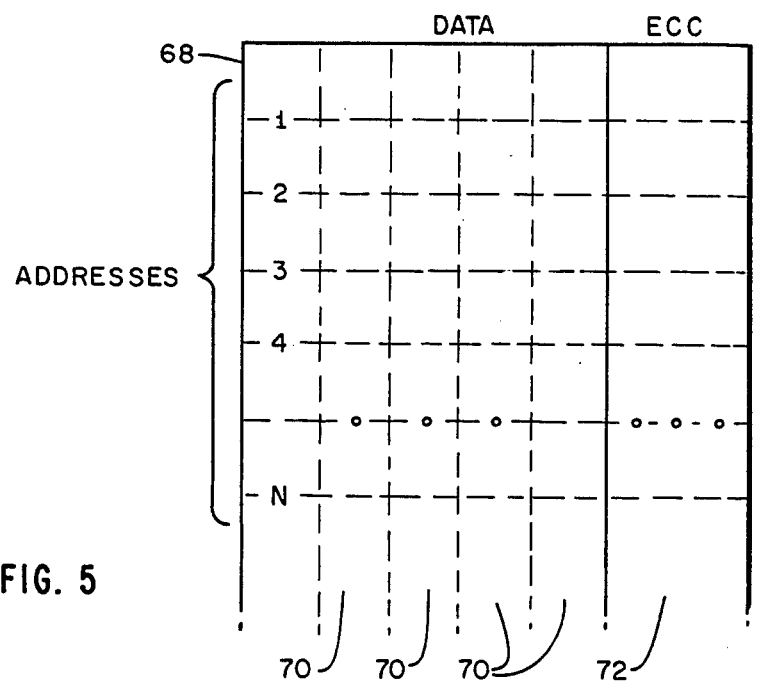
FIG. 5 is a memory allocation diagram useful in explaining the present invention.

FIG. 4 illustrates such a system in which a plurality of processors 50 and associated data buses 52, for application of data to be written to a memory, are associated such that the data on the buses 52 is assembled in an interface 54 into a single, large data word applied on an output bus 56. The data in the bus 56 will have a byte size of "NX", where "X" is the original byte size of the data on the buses 52 and "N" represents the number of processors 50 associated with a single interface 54. System timing and control circuitry 58, of the type typically provided in computer systems, is operated to insure that all of the data from the buses 52 simultaneously appears on the bus 56 to form a single combination data word. This data word is applied through an interface or buffer system 60 to a memory 62. Simultaneously, the data on the bus 56 is applied to an error encoder 64 which generates an error code on a bus 66 for application through interface 60 to memory 62 for storage at the same address as the data on the bus 56. The memory 62 may be plural separate memories or, as more typical, and as illustrated in FIG. 5, may be a single memory 68 partitioned, in each address location into cells 70, one corresponding to each of the processors 50 and a final cell 72 containing the error correcting code on the bus 66. In this manner, the memory 62 can in fact be viewed as plural memories or plural memory areas each associated with one of the processors 50.

Data is read from the memory 62 from each address, including the plural cells 70 and error cell 72 on an output bus 74 through a buffer or interface 76 to an error correcting system 78. The cell 72 is applied through a bus 72 through an interface 76 to an error detect and decode system 80 operative on the expanding error correcting codes generated for the larger data word on the bus 74 representing the combined data words associated with each processor 50. The error correcting system 78 responds to an indication of error from the error detect and decoder system 80 to provide correction of the anticipated errors appearing in the combined data word on bus 74, applying a corrected data word on a bus 82 through an interface circuit 84 which distributes the combined word onto plural output buses 86, one each associated with one of the processors 50. Data from each of the cells 70 for a single address is read simultaneously from the memory 62 to form a single large data word on which the error detecting system 80 can operate simultaneously to provide error correction as appropriate.

Given a low probability of error in the first place, assembling a greater number of bits in a single data word allows a more efficient and/or effective error correction encoding scheme to be utilized while at the same time only a single error correcting system is required for a plurality of processors and associated memories. It is to be noted that several error correcting methodologies are known, dependent upon specific predictions of likelihood of error patterns in the read/write memory cycles and that the invention is not limited to any particular one, or to any particular computational architecture. The generality of the invention is thus limited only in accordance wth the subject matter claimed below.

What is claimed:

1. An error correcting system for use with a plurality of digital processors and associated digital memory areas comprising:
    a plurality of digital processors;
    a digital memory area for data storage and retrieval;
    a control interface for communicating data between said plurality of digital processors and said digital memory area in a unitary digital word comprising portions from plural ones of said plural processors and for
    generating a unitary error correcting code as a function of said unitary digital word being written into said memory area from said plurality of processors and for providing error detection and correction as a function said unitary error correction code on said unitary digital word read from said memory area to corresponding ones of said plurality of processors.

2. The system of claim 1 further comprising system timing and control means for providing simultaneous writing and reading of the portions of said unitary digital word in said memory area corresponding to a unitary error correcting code.

3. The system of claim 1 further including external digital processing means for controlling said plurality of processors to provide a parallel processing relationship.

4. The system of claim 1 wherein each of said plurality of memory areas is associated with a corresponding one of each of said plurality of data processors.

5. The system of claim 1 wherein said plural memory areas comprise corresponding segments of a single memory address, one segment of said memory address being utilized for each error correcting code corresponding to the unitary digital word as a whole in plural other segments of said address.

6. The system of claim 1 wherein said error correcting code comprises a single parity bit.

7. The system of claim 1 wherein said error correcting code comprises a plurality of bits.

8. An error correcting method for use with a plurality of digital processors and associated digital memory area comprising:

writing and reading a unitary digital word having portions from and to plural ones of said processors into and out of a digital memory area;

generating a unitary error correcting code as a function of said unitary digital word being written into said memory area;

detecting errors corresponding to said written unitary digital word as read from said of memory area;

correcting detected errors as a function of said unitary correcting code in the read unitary digital word.

9. The method of claim 8 further including providing simultaneous wirting and reading of said unitary digital word in said memory area corresponding to a unitary error correcting code.

10. The method of claim 8 further including associating said plurality of processors to provide parallel processing.

11. The method of claim 8 wherein said memory area comprises a plurality of memory areas each associated with a corresponding one of each of said plurality of data processors.

12. The method of claim 11 wherein said plural memory areas comprise corresponding segments of a single memory address, one segment of said memory address being utilized for each error correcting code corresponding to the unitary digital word as a whole in other segments of said address.

* * * * *